May 19, 1964   P. J. HERZL   3,134,098
DIGITAL-TO-ANALOG CONVERTER
Filed June 7, 1960   2 Sheets-Sheet 2

| | | 337.5° | | | | 0° | | | | | 22.5° | | | | | 45° | | | | | 67.5° | | | | | 90° | | | | | 112.5° | 180° | 270° |
|---|---|---|---|---|---|---|---|---|---|---|---|---|---|---|---|---|---|---|---|---|---|---|---|---|---|---|---|---|---|---|---|---|---|
| BINARY COMMAND | TERMINALS | 28 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |
| | | 26 | 1 | 1 | 1 | 1 | 0 | 0 | 0 | 0 | 0 | 0 | 0 | 0 | 0 | 0 | 0 | 0 | 0 | 0 | 0 | 1 | 1 | 1 | 1 | 1 | 1 | 0 | 1 |
| | | 24 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 |
| | | 22 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 0 | 0 |
| | | 20 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 0 |
| | | 18 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 |
| DECIMAL EQU. | | | 60 | 61 | 62 | 63 | 0 | 1 | 2 | 3 | 4 | 5 | 6 | 7 | 8 | 9 | 10 | 11 | 12 | 13 | 14 | 15 | 16 | 17 | 18 | 19 | 20 | 32 | 48 |
| PROP. VALUES OF RESIST. STRINGS (IN THOUS.Ω) | | 46 | 12 | 13 | 14 | 15 | 0 | 1 | 2 | 3 | 4 | 5 | 6 | 7 | 8 | 9 | 10 | 11 | 12 | 13 | 14 | 15 | 0 | 1 | 2 | 3 | 4 | 0 | 0 |
| | | 49 | 4 | 3 | 2 | 1 | 16 | 15 | 14 | 13 | 12 | 11 | 10 | 9 | 8 | 7 | 6 | 5 | 4 | 3 | 2 | 1 | 16 | 15 | 14 | 13 | 12 | 16 | 16 |

INVENTOR
PETER J. HERZL
BY
ATTORNEY

United States Patent Office 3,134,098
Patented May 19, 1964

3,134,098
DIGITAL-TO-ANALOG CONVERTER
Peter Joseph Herzl, Montreal, Quebec, Canada, assignor to Sperry Gyroscope Company of Canada, Ltd., Montreal, Quebec, Canada
Filed June 7, 1960, Ser. No. 34,568
Claims priority, application Canada Feb. 4, 1960
20 Claims. (Cl. 340—347)

This invention relates to digital-to-analog conversion and more particularly to conversion of digital data to a mechanical position, for example, shaft angle.

When two signals $E_1$ and $E_2$ whose respective voltage amplitudes are related as the sine and cos of an angle are fed into the respective quadrature windings of the stator of a resolver, the error voltage induced in the rotor winding will be zero when the rotor displacement angle $\alpha$ coincides with the null angle $\theta$ which is equal to $$\tan^{-1}\frac{E_1}{E_2}$$

The null angle $\theta$ which is in quadrature with the vector magnetic field (resultant field) is determined by the ratio of $$\frac{E_1}{E_2}$$

and is therefore always equal to $$\tan^{-1}\frac{E_1}{E_2}$$

If the amplitudes of $E_1$ and $E_2$ are varied respectively as the sine and cos of angle $\theta$, the null position can be rotated through 360°, and the rotor angle $\alpha$ can be made to coincide with the null angle $\theta$ by driving the rotor with a servomotor in response to the error voltage induced in the resolver rotor. One of the main problems solved by the invention is a simple method and apparatus for employing digital information to produce the sine and cos related voltages $E_1$ and $E_2$ for a resolver input.

Among prior are proposals for converting digital data to approximations of sine and cos related voltages is a digitally controlled linear voltage divider which approximates the sine and cos voltage amplitude curves by the use of straight line segments. However, because of the use of straight line segments a tremendous amount of apparatus of considerable complexity is required to attain any reasonable degree of accuracy. In contrast, the present invention employs a relatively simple digitally controlled nonlinear impedance network for approximating the sine and cos voltages by means of curved segments, and obtains high orders of accuracy with relatively few components.

In accordance with one embodiment of the invention, the stator input windings of a resolver are supplied with sine and cos related inputs by a digitally controlled nonlinear impedance network. A servo motor responds to the error signal induced in the resolver rotor and by mechanical linkage operates to "null" the resolver rotor.

Accordingly, it is an object of the present invention to provide a simple method and apparatus for converting digital data to analog form.

Another object is to provide a new digital-to-analog shaft angle converter.

A further object is the attainment of the above objects by means of digitally controlled nonlinear impedance networks for generating curved segments approximating corresponding portions of trigonometric function generated voltage curves.

It is a further object of the present invention to provide a high order of accuracy in the attainment of the above objects.

Further objects and advantages of the present invention will be apparent from the following description, reference being had to the accompanying drawings wherein a preferred form of the present invention is clearly shown.

Figure 1:
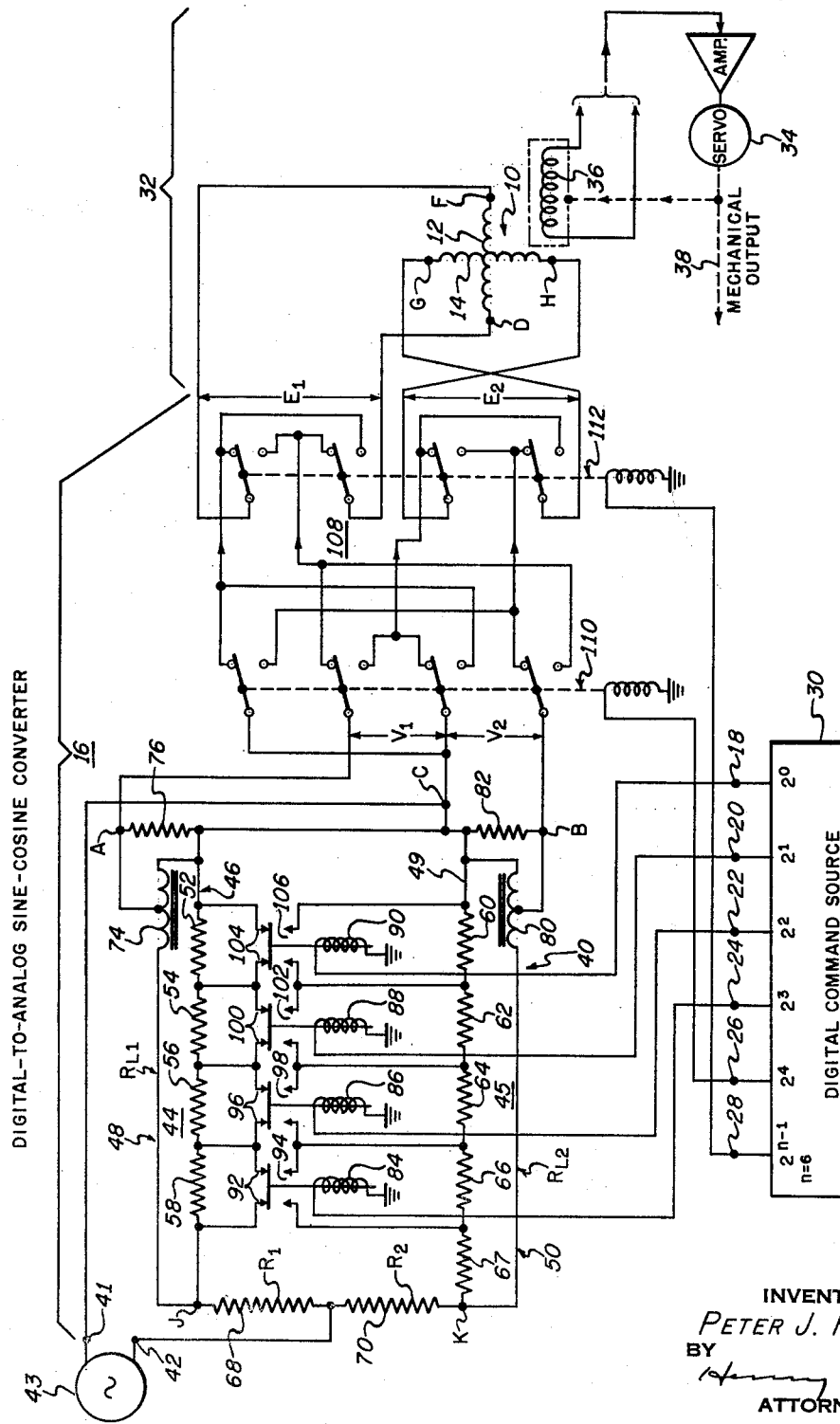
FIG. 1 is a diagram of a digital-to-analog shaft positioner embodying the invention.
Figures 2, 3:
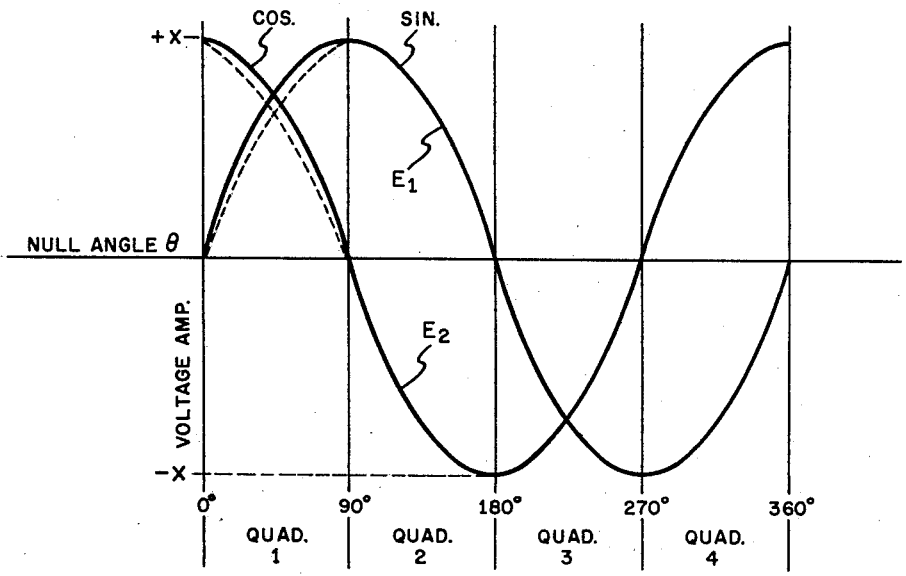
FIG. 2 is a graph showing sine and cos related voltages for operating a resolver.
FIG. 3 is a chart showing the relationship of binary commands, certain resistance ratios of the described system, and digitized angle increments.

As hereinbefore mentioned, the null position or angle $\theta$ of a resolver, such as shown in FIG. 1 at 10, is determined by the ratio of the respective amplitudes of the voltages $E_1$ and $E_2$ supplied to the quadrature stator windings 12 and 14 at the time, and, to rotate the null angle $\theta$, the amplitudes of the respective input voltages $E_1$ and $E_2$ are varied as the sine and cos of $\theta$ as this angle is increased by rotation. This is illustrated in FIG. 2 wherein the sine and cos related amplitudes of the voltages $E_1$ and $E_2$ are plotted against the null angle $\theta$ produced by different ratios of the amplitudes of the two voltages. The amplitude of $E_1$ is shown varying as sine $\theta$ while that of $E_2$ is shown varying as cos $\theta$.

Angles may be digitized in binary form employing the following relations:

$$\frac{360°}{2^n}=\text{quantized angle or arc segment}$$

where $n$=the number of orders or digit positions in the binary code. For example, in the case of a 6-digit binary code, a 360° arc can be quantized into 64 points, 5.625° apart, and the central angle at any particular point is equal to 5.625° multiplied by the decimal equivalent of the binary number. For example, binary 101101 in the 32–16–8–4–2–1 binary code (significance decreasing from left to right) represents $45 \times 5.625°=253.125°$. On the same basis the 360° could be divided in four quadrants with 0° to 84.375° being represented by decimals 0–15 and binary equivalent 000000–001111; 90° to 174.375° by decimal 16–31 and binary 010000–011111; 180° to 264.375° by decimal 32–47 and binary 100000–101111; and 270° to 354.375° by decimal 48–63 and binary 110000–111111. This angle quantization is applied to the null position angle $\theta$ as indicated in FIG. 3, which shows the binary information that is to be converted to provide the proper ratio of voltage amplitudes requisite for given null positions.

A circuit for converting binary information representing $$\frac{\sin}{\cos}\text{ ratios}$$

to curved approximations of the sine-cosine related voltage amplitudes in accordance with the invention is indicated at 16 in FIG. 1, under the legend Dig.-to-Sine-Cosine Converter. It includes digital input terminals 18, 20, 22, 24, 26 and 28 connected to a digital command source 30 such as a binary register, or a reader for extracting recorded binary information, or any other suitable source of digital information representing, for example, the sine-cosine voltage amplitude ratio necessary to provide a desired shaft position. In the specific examples shown, the converter responds to information in a six digit natural binary code. The converter 16 energizes a self-balancing servo system 32 which includes the vector adding resolver 10, and a servomotor 34 that is energized by the error signal from the resolver rotor 36. The mechanical output 38 of the servomotor 34 is linked to drive the resolver rotor 36 to the null position.

From FIG. 2, it is seen that if either of the curves increases or decreases in amplitude in one quadrant, it does the opposite in the next quadrant. Also, in each quadrant if the amplitude of one of the curves is increasing in either + or − phase, the amplitude of the other curve is decreasing in either + or − phase depending on the quadrant. Thus, the number parts of ratios between the two curves repeat from quadrant to quadrant, with appropriate sign or phase changes, the progression of the ratios in adjacent quadrants being in inverse order. For example, in the first quadrant the ratio of $$\frac{E_1}{E_2} \text{ increases from } \frac{0}{+X} \text{ to } \frac{+X}{0}$$

while in the second quadrant the ratio decreases from $$\frac{+X}{0} \text{ to } \frac{0}{-X}$$

Neglecting sign or phase, the ratio numbers repeat in inverse order in all adjacent pairs of quadrants. Thus, two signals whose ratio can be varied from $$\frac{0}{X} \text{ to } \frac{X}{0}$$

can generate the sine-cosine related curves of FIG. 2 by appropriate phase switching from quadrant to quadrant.

In the converter 16, two voltages $V_1$ and $V_2$, whose ratio $$\frac{V_1}{V_2} \text{ can be varied from } \frac{0}{X} \text{ to } \frac{X}{0}$$

are generated by a network 40 at its output terminals A—C and B—C in response to binary information representing the desired ratio received at its digital input terminals 18, 20, 22 and 24 from the command source 30. The network 40 is energized through its power input terminals 41 and 42 from an A.C. source 43 of suitable frequency for operating the servo system 32. Included in the network 40 are two impedance networks 44 and 45. Impedance network 44 includes in parallel a resistance string 46 and a load branch 48, while impedance network 45 includes in parallel a resistance string 49 and a load branch 50. Each of strings 46 and 49 includes four series-connected resistors with resistance values proportional to a particular array of four digit orders of the six digit code, for example, the four least significant digits or the 1–2–4–8 binary relation. Thus, in the string 46, the respective values in ohms of the resistors 52, 54, 56 and 58 may be 1,000, 2,000, 4,000 and 8,000 and correspondingly in string 49 the values of the resistors 60, 62, 64 and 66 will be 1,000, 2,000, 4,000 and 8,000 ohms respectively. String 49 additionally includes in series a resistor 67 having the value of the lowest increment in the rest of the string, that is, 1,000 ohms.

The left ends of the impedance networks 44 and 45 are respectively connected to power input terminal 42 through similar resistors 68 and 70, while the other ends of these networks are connected through point C to power input terminal 41. Load branch 48 is connected across circuit points J and C, and includes an autotransformer 74, a load resistor 76 connected across the "secondary" of the autotransformer, and one of the resolver stator windings across the resistor 76. Likewise load branch 50 is connected across circuit points K and C, and includes an autotransformer 80, a load resistor 82 and the other stator winding of resolver 10. Since the transformation ratios of transformers 74 and 80 are the same, their effects are unimportant in an explanation of the invention, and the voltages $V_1$ and $V_2$ may be considered the same as the voltages across points J—C and K—C, respectively.

Each of four binary relays 84, 86, 88 and 90, whose operating windings are connected respectively to digital input terminals 24, 22, 20 and 18, is provided with normally open and normally closed relay contacts arranged to add into and subtract from their respective strings, the resistors of a corresponding pair, by shorting one resistor in one position of the switch and shorting the other resistor of the pair in the other position of the switch. The arrangement being such that when one resistor of a corresponding pair, for example resistor 52, is unshorted and added in to its string 46, the other corresponding resistor 60 is shorted and subtracted from its string 49. Thus, relay 90 is associated with the corresponding pair of resistors 52 and 60, relay 88 is associated with the corresponding pair of resistors 54 and 62, etc. The specific arrangement shown by way of example is that each of the binary relays in its unoperated condition shorts its associated resistor in string 46 by means of normally closed contacts while the corresponding resistor in string 49 is unshorted by virtue of the normally open contacts of the relay. The effect is that each switch, when reversing positions, adds to one string the same amount of resistance that it subtracts from the other string. Relay 84 is provided with normally closed contacts 92 connected across resistor 58 and normally open contacts 94 connected across resistor 66. Relay 86 is provided with normally closed contacts 96 connected across resistor 56 and normally open contacts 98 connected across resistor 64. Relay 88 includes normally closed contacts 100 across resistor 54 and normally open contacts 102 across resistor 62. In like manner, relay 90 has normally closed contacts 104 connected across resistor 52 and normally open contacts 106 across resistor 60. In this example, the above-described relays and all the other relays in FIG. 1 are in their normal or unoperated state when their respective energizing windings are unenergized. This is the state illustrated in FIG. 1. Also, for purposes of this example, it is considered that the binary 1 signal will energize a relay and that the relay will be unenergized in response to a binary 0 signal. The arrangement of network 40 provides nonlinear output characteristics across the respective load resistors 76 and 82 in response to binary information supplied to the digital input of the network 40.

In FIG. 2, the solid line curves indicate the theoretical amplitudes required to operate the resolver through the four quadrants. The nonlinear response of the network 40 to binary information is almost sinusoidal and its outputs, as indicated by the dotted curves of FIG. 2 shown only for the first quadrant, are an approximation of the theoretical sine and cosine curves. These sine and cosine approximations provide an extremely accurate approximation of the sine-cosine ratio at any given angle $\theta$.

Having four binary places, the impedance network 40 provides sixteen positional ratios per quadrant as illustrated in the chart of FIG. 3, the necessary phase variations between quadrants being provided by a binary switching circuit 108 responsive to the two highest order digits of the 6-digit command source 30.

The switching network 108 includes binary relays 110 and 112 whose operating coils are respectively connected to receive digital information through terminals 26 and 28 from the digital command source 30. Each of these relays is provided with sets of normally open and normally closed contacts in a mutual arrangement which establishes the necessary phasing connections for each quadrant. The relay combinations associated with the particular quadrants, and the connections established between circuit points for each combination of the relays of the switching network 108 are indicated in the following self-explanatory table:

*Quadrant*

| Quadrant | 1 | 2 | 3 | 4 |
|---|---|---|---|---|
| Relays | 110—Off<br>112—Off | 110—On<br>112—Off | 110—Off<br>112—On | 110—On<br>112—On |
| Connections between circuit points. | A—D<br>B—G<br>F—C<br>H—C | A—H<br>B—D<br>F—C<br>G—C | A—F<br>B—H<br>D—C<br>G—C | A—G<br>B—F<br>D—C<br>H—C |

("Off"=unoperated; "On"=operated).

In considering the operation of the system, it is helpful to assign workable relative or absolute values to parts of the circuit. For example, practical values of resistors 68 and 70 and load branches 48 and 50 for use with the hereinbefore suggested resistance values in the network 40 may be as follows:

Resistor $68 = 90{,}000$ ohms $= R_1$;
Resistor $70 = 90{,}000$ ohms $= R_2$;
Total effective resistance of load branch $48 = 42{,}500$ ohms $= R_{L1}$; and
Total effective resistance of load branch $50 = 42{,}500$ ohms $= R_{L2}$.

The suggested resistance values are not necessarily optium values. They may be optimized by well-known methods of calculation, or even empirically, especially by adjustment of resistors 68 and 70, and the impedance of the load branches 48 and 50.

The chart of FIG. 3 shows a number of the 64 angular positions into which 360° may be quantized by a 6-digit binary code. Twenty-five consecutive positions are shown extending from 337.5° through 0° to 112.5°. Part of the chart is compressed to include the 180° and 270° positions. The column at each angle position includes from top to bottom, the following items related to the position: 6-digit binary command representing the angle at that position; the decimal equivalent of the binary command; and the proportional values of the resistance strings 46 and 49 resulting from that command. In the chart, each digit of the command is related to the terminal to which it is applied, and the order of significance increases in the upward direction in the column.

From the chart in FIG. 3, it is seen that the binary command 000000 at the digital input terminals (28—26—24—22—20—18) corresponds to a desired 0° position. The decimal equivalent of this command is 0. All six binary relays are unoperated, and, in this state, which incidentally is the particular one shown in FIG. 1, all the resistors in resistor string 46 are shunted by their associated relays while the corresponding four resistors in string 49 are "unshunted." Thus, the resistance of the string 46 is 0 while that of the string 49 is 16,000 ohms, as indicated in the two lowest places of the 0° position column. If it is assumed that the voltage of the source 43 is 1 volt, the resultant resistance value of impedance network 44 will provide a drop of 0 volts across point J and C which, as modified by the transformation ratio T of transformer becomes $0T = V_1$, and is applied as $E_1$ in the + phase to the winding 12. At the same time, the resultant resistance value of impedance network 45 will provide a drop of .1143828 volt across points K and C which, as modified by the transformer, becomes $.1143828T = V_2$, and is applied as $E_2$ in the + phase to winding 14. The particular phasing and stator windings to which the respective voltages are applied is due to the state of the relays 110 and 112, in this case both being unoperated in response to binary 0's in the 5th and 6th orders of the command signal. Since the voltages developed by networks 44 and 45 and "phased" by the switch network 108 represent the sine and cosine respectively, their ratio $$\frac{E_1}{E_2}$$

is equal to the tangent of the actual null angle $\theta$. Specifically, for the command just described this is:

$$\frac{0}{.1143828} = 0 = \tan 0°$$

Thus, the actual and desired null angle $\theta$ is the same. This in the resolver will produce a resultant magnetic vector in quadrature with a null position of 0°. It may be noted at this point the relays 110 and 112 remain unoperated for all command positions in the first quadrant.

Next, consider the decimal position 4 which corresponds to 22.5°. The binary command for this position is 000100. For this command, only relay 86 is operated, and as it reverses positions, it unshorts the resistor 56 and shorts resistor 64 providing thereby 4000 ohms resistance in the string 46 and 12,000 ohms in the string 49, as indicated in the chart of FIG. 3 by the proportional values 4 and 12. The resulting voltages $V_1$ and $V_2$ will be $.03903555T$ and $.09418263T$, respectively. Relays 110 and 112 being unoperated, the voltage $V_1$ is applied as $E_1$ to winding 12 in the + phase while the voltage $V_2$ is applied as $E_2$ in + phase to the winding 14. The ratio $$\frac{.03903555T}{.09418263T} = .414466 = \tan 22°30.7'$$

which is only .7 minute from the desired commanded position 22.5°.

The voltages $V_1$ and $V_2$ may be calculated as follows:
Let $R_{G1}$ be the net resistance between J and C,
$R_{G2}$ be the net resistance between K and C,
$R_{S1}$ the resistance of string 46, and
$R_{S2}$ the resistance of string 49.

$$R_{G1} = \frac{R_{L1} R_{S1}}{R_{L1} + R_{S1}}$$

$$R_{G2} = \frac{R_{L2} R_{S2}}{R_{L2} + R_{S2}}$$

Voltage across $J - C = 1 \cdot \frac{R_{G1}}{R_{G1} + R_1}$ and $V_1 = 1 \cdot \frac{R_{G1}}{R_{G1} + R_1} \cdot T$ Voltage across $K - C = 1 \cdot \frac{R_{G2}}{R_{G2} + R_2}$ and $V_2 = 1 \cdot \frac{R_{G2}}{R_{G2} + R_2} \cdot T$ The sixteen possible command positions of the first four digits applied to terminals 18, 20, 22 and 24 are repeated in the same order in every quadrant. The phase and coil changes from quadrant to quadrant are made by the last two digits of the command signal applied to terminals 26 and 28 which control the relays 110 and 112. The particular combination of the relays 110 and 112 for the various quadrants is illustrated by the commands at the positions 0°, 90°, 180° and 270° (FIG. 3). At 0° and for the first quadrant, the last two digits are binary 0's and the relays 110 and 112 are unoperated. The phasing and connections to the stator windings for this relay combination has been previously explained. In the command positions for 90° and the second quadrant, relay 110 is operated by binary 1 while relay 112 is unoperated due to a binary 0, thus applying the voltage $V_1$ from impedance network 44 to stator winding 14 in the − phase, while the voltage from impedance network 45 is applied in + phase to stator winding 12. In the command for 180° a binary 1 energizes relay 112 while relay 110 is unoperated due to a binary 0, thereby applying the voltage of impedance network 44 to winding 12 in the − phase and the voltage of impedance network 45 across winding 14 in the − phase. This combination persists through the third quadrant. In response to the command for 270°, binary 1's operate both relays 110 and 112, connecting the voltage of network 44 to winding 14 in the + phase and the voltage of network 45 to winding 12 in the − phase. The switching system 108 provides a means whereby the resolver null due to any given set of voltage values of $V_1$ and $V_2$ is rotated in 90° increments as required.

With the suggested resistance values, the commands for 11°15′, 45°, 67°30′, 112°30′, 191°15′, and 292°30′, will respectively produce the following voltage relations and resulting angles $\theta$.

| Command Position (Dec. Equi.) | Voltage Ratio $\frac{E_1}{E_2}$ | Actual $\theta =$ Tan$^{-1}\frac{E_1}{E_2}$ | Desired $\theta$ | Error |
|---|---|---|---|---|
| 2 | $\frac{.020782421T}{.10475453T}$ | 11°13.2′ | 11°15′ | −1.8′ |
| 8 | $\frac{.06960058T}{.06960058T}$ | 45° | 45° | 0 |
| 12 | $\frac{.09418263T}{.03903555T}$ | 67°29.3′ | 67°30′ | −.7′ |
| 20 | $\frac{.09418263T}{-.03903555T}$ | 112°30.7′ | 112°30′ | +.7′ |
| 34 | $\frac{-.020782421T}{-.10475453T}$ | 191°13.2 | 191°15′ | −1.8′ |
| 52 | $\frac{-.09418263T}{.03903555T}$ | 292°30.7′ | 292°30′ | +.7′ | indicating a maximum error of ±1.8 minutes.

While the illustrated apparatus is described in connection with a 6-digit binary code to simplify the understanding thereof, it will be appreciated that if more or less than 16 positions per quadrant are desired, the number of corresponding pairs of resistors in the strings 46 and 49 may, together with the associated relays, be reduced or increased with corresponding changes in the number of digit places in the code. For example, five pairs of corresponding resistors and five relays associated therewith in connection with a 7-digit code will provide 32 possible positions per quadrant, and so on. In practice, the tremendous accuracy afforded by this system is best taken advantage of by quantizing the angle into smaller units and in accordance therewith increasing the number of digits in the code. Likewise the illustrated apparatus is not confined to the use of the natural binary code. Various codes may be devised for use with the apparatus illustrated providing the values of the resistors in the strings 46 and 49 are made proportional to the digits of the code employed. For example, a very simple 9-digit and 10-position straight decimal system could be employed wherein each of the resistors in both strings 46 and 49 would have the same value and the code commands for the 10 positions would be 000000000, 100000000, 110000000, 111000000, 111100000, . . . 111111111. This is in addition to the two digit places employed for the various phasing and coil connection combinations provided by the switch network 108.

As previously noted, the value of each resistor in string 46 is proportional to the value of the digit place which controls the relay associated with the resistor. For example, in the suggested natural binary code, the digit order which controls relay 84 associated with resistor 58 is $2^3$. The suggested value of resistor is 8000 ohms and the basic increment is 1000 ohms. Thus, 8000 is proportional to $2^3$, the value of the digit order which controls resistor 58. Likewise, resistor 54, at 2000 ohms, is proportional to $2^1$, the value of the digit order which controls relay 88 associated with resistor 54. The above relations may be expressed by stating that the resistors have values proportional to the digits of the code employed. This is true whether the code is a binary code or some other code.

It should also be noted that the described apparatus will operate with a direct connection substituted for the resistor 67. Without this resistor the "paper" complexity of the command code is somewhat increased. For example, considering the first four digit positions which operate the network 40, the binary number 1111 (decimal 15) could not be used and would have to be skipped in each quadrant. Because of this skipping, if the commands would be in the natural binary code for the first quadrant, then at 90° and through the second quadrant the commands would have to be in the excess 1 binary code. Likewise, in the third quadrant the excess two binary code would be used while in the fourth quadrant the excess three binary code would be used. If a direct connection is substituted for the resistor 67, and no code numbers are skipped, the error is 1 point or position once in each quadrant. This becomes less significant as the number of points or positions in which each quadrant is divided is increased. If each quadrant is divided into enough points or positions, the error of one point becomes unimportant.

The transformers 74 and 80 which provide transformation ratio also provide impedance matching. However, if desired, especially for use with D.C., the transformers and their associated load resistors 76 and 82 may be replaced by one load resistor across points J and C for the network 44 and by one load resistor across points K and C for the impedance network 45. In case load resistors are substituted for the transformers, and A.C. is used, impedance matching could be provided by interposing cathode followers between the outputs of the network 40 and the resolver stator windings.

A permanent magnet rotor could be substituted for the wound resolver rotor shown, and its position could be controlled by the resulting magnetic vector produced in the resolver by the invention. This vestor is in quadrature with the null position of the illustrated wound rotor of the resolver. With either a wound rotor or a permanent magnet rotor, the instrument may be generally referred to as a resolver. While the resolver 10 is shown as a comparator in a servo system, it should be appreciated that it may be employed in all other known resolver uses, for example, as a computing element, phase shifter, etc. In some of these uses the rotor employing one or two windings is kept stationary, and the rotor windings are connected to obtain the desired output in response to the digital programming scheme of the present invention.

The resistors 68 and 70 permit the voltage to change across the respective networks in response to the code induced resistance changes in their respective strings. This nonlinear response may also be obtained by eliminating resistors 68 and 70 and connecting a respective constant current source directly to each string in place of source 43.

What is claimed is:

1. Apparatus for converting $n$-digit code commands into analog form comprising first and second impedance networks, the first network including in parallel a first resistor string and a first load branch, the second impedance network including in parallel a second resistor string and a second load branch, each of said strings having $n−x$ number of series-connected resistors having resistance values proportional to the digit orders of a particular array of $n−x$ digit orders of said code, means for providing nonlinear response in said load branches in response to said array of $n−x$ digits of said commands, said means comprising $n−x$ number of two mode switches each arranged to short a resistor in one of said strings in one mode and to short the corresponding value resistor in the other string in the other mode, means for controlling said switches by said particular array of $n−x$ number of digits of said commands, first and second output circuits, and means responsive to the remaining digits of said commands for establishing connections between said output circuits and said load branches.

2. Apparatus for converting $n$-digit code commands into analog form comprising first and second impedance networks, the first network including in parallel a first resistor string and a first load branch, the second impedance network including in parallel a second resistor string and a second load branch, each of said strings having $n-x$ number of series-connected resistors having resistance values proportional to the digit orders of a particular array of $n-x$ digit orders of said code, one of said strings having within it an additional series resistor, means for providing nonlinear response in said load branches in response to said array of $n-x$ digits of said commands, said means comprising $n-x$ number of two mode switches each arranged to short a resistor in one of said strings in one mode and to short the corresponding value resistor in the other string in the other mode, means for controlling said switches by said particular array of $n-x$ number of digits of said commands, first and second output circuits, and means responsive to the remaining digits of said commands for establishing connections between said output circuits and said load branches.

3. Apparatus for converting $n$-digit code commands into analog form comprising first and second impedance networks, a first resistor in series with said first network, a second resistor in series with said second network, the first network including in parallel a first resistor string and a first load branch, the second impedance network including in parallel a second resistor string and a second load branch, each of said strings having $n-x$ number of series-connected resistors having resistance values proportional to the digit orders of a particular array of $n-x$ number of digits of said code, $n-x$ number of two-mode switches each arranged to short a resistor in one of said strings in one mode and to short a corresponding value resistor in the other string in the other mode, means for controlling said switches in response to information in said particular array of $n-x$ number of digits of said commands, first and second output circuits, and means responsive to the information in the remaining digits of said commands for establishing connections between said output circuits and said load branches.

4. Apparatus for converting $n$-digit code commands into analog form comprising first and second impedance networks, a first resistor in series with said first network, a second resistor in series with said second network, the first network including in parallel a first resistor string and a first load branch, the second impedance network including in parallel a second resistor string and a second load branch, each of said strings having $n-x$ number of series-connected resistors having resistance values proportional to the digit orders of a particular array of $n-x$ number of digits of said code, one of said strings having within it an additional series resistor of the same value as that of the lowest valued one of said other resistors in the string, $n-x$ number of two-mode switches each arranged to short a resistor in one of said strings in one mode and to short a corresponding value resistor in the other string in the other mode, means for controlling said switches in response to information in said particular array of $n-x$ number of digits of said commands, first and second output circuits, and means responsive to the information in the remaining digits of said commands establishing connections between said output circuits and said load branches.

5. Apparatus for converting $n$-digit code commands to an analog form comprising first and second impedance networks, each including in parallel a resistor string and a load branch, a resistor in series with each of said networks, $n-x$ number of pairs of corresponding value resistors, the resistors of each pair being in different ones of said strings, $n-x$ number of two position switches, one associated with each pair of corresponding resistors and arranged to short one resistor of the pair in one position and to short the other resistor of the pair in the other position, means for controlling each of said switches in response to the command at a different digit order in a particular array of $n-x$ digits of said code, each resistor in each of said pairs having a value proportional to the digit order controlling the switch associated with that pair, a pair of output circuits, and switching means responsive to the remaining digit orders of said code for interconnecting the respective load branches to the respective output circuits in accordance with the particular commands appearing in said remaining orders.

6. Apparatus for converting $n$-digit code commands to an analog form comprising first and second impedance networks, each including in parallel a resistor string and a load branch, a resistor in series with each of said networks, $n-x$ number of pairs of corresponding value resistors, the resistors of each pair being in different ones of said strings, one of said strings having within it an additional series resistor, $n-x$ number of two position switches, one associated with each pair of corresponding resistors and arranged to short one resistor of the pair in one position and to short the other resistor of the pair in the other position, means for controlling each of said switches in response to the command at a different digit order in a particular array of $n-x$ digits of said code, each resistor in each of said pairs having a value proportional to the digit order controlling the switch associated with that pair, a pair of output circuits and switching means responsive to the remaining digit orders of said code for interconnecting the respective load branches to the respective output circuits in accordance with the particular commands appearing in said remaining orders.

7. Apparatus for converting $n$-digit code commands into analog form comprising first and second impedance networks, the first network including in parallel a first resistor string and a first load branch, the second impedance network including in parallel a second resistor string and a second load branch, each of said strings having $n-x$ number of series-connected resistors having resistance values proportional to the digit orders of a particular array of $n-x$ digit orders of said code, means for providing nonlinear response in said load branches in response to said array of $n-x$ digits of said commands, said means comprising $n-x$ number of two mode switches each arranged to short a resistor in one of said strings in one mode and to short the corresponding value resistor in the other string in the other mode, means for controlling said switches by said particular array of $n-x$ number of digits of said commands, a resolver having first and second input windings, and means responsive to the remaining digits of said commands for establishing connections between said input windings and said load branches.

8. Apparatus for converting $n$-digit code commands into analog form comprising first and second impedance networks, a first resistor in series with said first network, a second resistor in series with said second network, the first network including in parallel a first resistor string and a first load branch, the second impedance network including in parallel a second resistor string and a second load branch, each of said strings having $n-x$ number of series-connected resistors having resistance values proportional to the digit orders of a partciular array of $n-x$ number of digits of said code, $n-x$ number of two mode switches each arranged to short a resistor in one of said strings in one mode and to short a corresponding value resistor in the other string in the other mode, means for controlling said switches in response to information in said particular array of $n-x$ number of digits of said commands, a resolver having first and second input stator windings, and means responsive to the information in the remaining digits of said commands for establishing connections between said stator windings and said load branches.

9. Apparatus for converting $n$-digit code commands to an analog form comprising first and second impedance networks, each including in parallel a resistor string and a load branch, a resistor in series with each of said networks, $n-x$ number of pairs of corresponding value resistors, the resistors of each pair being in different ones of said strings, $n-x$ number of two position switches, one associated with each pair of corresponding resistors and arranged to short one resistor of the pair in the position and to short the other resistor of the pair in the other position, means for controlling each of said switches in response to the command at a different digit order in a particular array of $n-x$ digits of said code, each resistor in each of said pairs having a value proportional to the digit order controlling the switch associated with that pair, a resolver having first and second stator input windings, and switching means responsive to the remaining digit orders of said code for interconnecting the respective load branches to said respective input windings in accordance with the particular commands appearing in said remaining orders.

10. Apparatus for converting $n$-digit code commands into analog form comprising first and second impedance networks, the first network including in parallel a first resistor string and a first load branch, the second impedance network including in parallel a second resistor string and a second load branch, each of said strings having $n-x$ number of series-connected resistors having resistance values proportional to the digit orders of a particular array of $n-x$ digit orders of said code, means for providing nonlinear response in said load branches in response to said array of $n-x$ digits of said commands, said means comprising $n-x$ number of two mode switches each arranged to short a resistor in one of said strings in one mode and to short the corresponding value resistor in the other string in the other mode, means for controlling said switches by said particular array of $n-x$ number of digits of said commands, a servo system including a resolver having first and second stator input windings, and means responsive to the remaining digits of said commands for establishing connections between said input windings and said load branches.

11. Apparatus for converting $n$-digit code commands to an analog form comprising first and second impedance networks, each including in parallel a resistor string and a load branch, a resistor in series with each of said networks, $n-x$ number of pairs of corresponding value resistors, the resistors of each pair being in different ones of said strings, $n-x$ number of two position switches, one associated with each pair of corresponding resistors and arranged to short one resistor of the pair in one position and to short the other resistor of the pair of the other position, means for controlling each of said switches in response to the command at a different digit order in a particular array of $n-x$ digits of said code, each resistor in each of said pairs having a value proportional to the digit order controlling the switch associated with the pair, a servo system including a resolver having first and second input stator windings, and switching means responsive to the remaining digit orders of said code for interconnecting the respective load branches to the respective stator windings in accordance with the particular commands appearing in said remaining orders.

12. Apparatus for converting $n$-digit code commands into analog form comprising first and second impedance networks, the first network including in parallel a first resistor string and a first load branch, the second impedance network including in parallel a second resistor string and a second load branch, each of said strings having $n-x$ number of series-connected resistors having resistance values proportional to the digit orders of a particular array of $n-x$ digits of said code, means for providing nonlinear response in said load branches in response to said array of $n-x$ digits of said commands, said means comprising $n-x$ number of two mode switches each arranged to short a resistor in one of said strings in one mode and to short the corresponding value resistor in the other string in the other mode, means for controlling said switches by said particular array of $n-x$ number of digits of said commands, first and second output circuits, and four-mode switching means responsive to the information in the remaining digits of said commands for establishing connections between said output circuits and said load branches, each mode thereof being assumed in response to a different combination of the information in said remaining digits, said switch in one mode connecting the first and second load branches in $+$ phase respectively to the first and second output circuits, said switch in the second mode connecting the first and second load branches in $-$ and $+$ phase respectively to the second and first output circuits, said switch in the third mode connecting the first and second load branches in $-$ phase respectively to the first and second output circuits, and in the fourth mode connecting the first and second load branches in $+$ and $-$ phase respectively to the second and first output circuits.

13. Apparatus for converting $n$-digit code commands to an analog form comprising first and second impedance networks, each including in parallel a resistor string and a load branch, a resistor in series with each of said networks, $n-x$ number of pairs of corresponding value resistors, the resistors of each pair being in different ones of said strings, $n-x$ number of two position switches, one associated with each pair of corresponding resistors and arranged to short one resistor of the pair in one position and to short the other resistor of the pair in the other position, means for controlling each of said switches in response to the command at a different digit order in a particular array of $n-x$ digits of said code, each resistor in each of said pairs having a value proportional to the digit order controlling the switch associated with that pair, first and second output circuits, and four-mode switching means responsive to the remaining digit orders of said code for interconnecting the respective load branches to the respective output circuits in accordance with the particular commands appearing in said remaining orders, each mode thereof being assumed in response to a different combination of the information in said remaining digits, said switch in one mode connecting the first and second load branches in $+$ phase respectively to the first and second output circuits, said switch in the second mode connecting the first and second load branches in $-$ and $+$ phase respectively to the second and first output circuits, said switch in the third mode connecting the first and second load branches in $-$ phase respectively to the first and second output circuits, and in the fourth mode connecting the first and second load branches in $+$ and $-$ phase respectively to the second and first output circuits.

14. Apparatus for converting $n$-digit code commands into analog form comprising first and second impedance networks, the first network including in parallel a first resistor string and a first load branch, the second impedance network including in parallel a second resistor string and a second load branch, each of said strings having $n-x$ number of series-connected resistors having resistance values proportional to the digit orders of a particular array of $n-x$ digits of said code, means for providing nonlinear response in said load branches in response to said array of $n-x$ digits of said commands, said means comprising $n-x$ number of two mode switches each arranged to short a resistor in one of said strings in one mode and to short the corresponding value resistor in the other string in the other mode, means for controlling said switches by said particular array of $n-x$ number of digits of said commands, a resolver having first and second stator input windings, and four-mode switching means responsive to the information in the remaining digits of said commands for establishing connections between said input windings and said load branches, each mode thereof being assumed in response to a different combination of the information in said remaining digits, said switch in one mode connecting the first and second load branches in + phase respectively to the first and second input windings, said switch in the second mode connecting the first and second load branches in — and + phase respectively to the second and first input windings, said switch in the third mode connecting the first and second load branches in — phase respectively to the first and second input windings, and in the fourth mode connecting the first and second load branches in + and — phase respectively to the second and first input windings.

15. Apparatus for converting $n$-digit code commands to an analog form comprising first and second impedance networks, each including in parallel a resistor string and a load branch, a resistor in series with each of said networks, $n-x$ number of pairs of corresponding value resistors, the resistors of each pair being in different ones of said strings $n-x$ number of two position switches, one associated with each pair of corresponding resistors and arranged to short one resistor of the pair in one position and to short the other resistor of the pair in the other position, means for controlling each of said switches in response to the command at a different digit order in a particular array of $n-x$ digits of said code, each resistor in each of said pairs having a value proportional to the digit order controlling the switch associated with that pair, a resolver having first and second stator input windings, and four-mode switching means responsive to the remaining digit orders of said code for interconnecting the respective load branches to the respective stator windings in accordance with the particular commands appearing in said remaining orders, each mode thereof being assumed in response to a different combination of the information in said remaining digits, said switch in one mode connecting the first and second load branches in + phase respectively to the first and second stator windings, said switch in the second mode connecting the first and second load branches in — and + phase respectively to the second and first stator windings, said switch in the third mode connecting the first and second load branches in — phase respectively to the first and second stator windings, and in the fourth mode connecting the first and second load branches in + and — phase respectively to the second and first stator windings.

16. Apparatus for converting $n$-digit code commands into analog form comprising first and second impedance networks, the first network including in parallel a first resistor string and a first load branch, the second impedance network including in parallel a second resistor string and a second load branch, each of said strings having $n-x$ number of series-connected resistors having resistance values proportional to the digit orders of a particular array of $n-x$ digits of said code, one of said strings having within it an additional series resistor of the same value as that of the lowest valued one of said other resistors in the string, means for providing nonlinear response in said load branches in response to said array of $n-x$ digits of said commands, said means comprising $n-x$ number of two mode switches each arranged to short a resistor in one of said strings in one mode and to short the corresponding value resistor in the other string in the other mode, means for controlling said switches by said particular array of $n-x$ number of digits of said commands, first and second output circuits, and four-mode switching means responsive to the information in the remaining digits of said commands or establishing connections between said output circuits and said load branches, each mode thereof being assumed by a different combination of the information in said remaining digits, said switch in one mode connecting the first and second load branches in + phase respectively to the first and second output circuits, said switch in the second mode connecting the first and second load branches in — and + phase respectively to the second and first output circuits, said switch in the third mode connecting the first and second load branches in — phase respectively to the first and second output circuits, and in the fourth mode connecting the first and second load branches in + and — phase respectively to the second and first output circuits.

17. Apparatus for converting $n$-digit code commands into analog form comprising first and second impedance networks, the first network including in parallel a first resistor string and a first load branch, the second impedance network including in parallel a second resistor string and a second load branch, means for providing nonlinear response in said load branches in response to a particular array of $n-x$ digits of said commands, said means comprising $n-x$ number of two-mode switches each arranged to short out a quantity of resistance in one of said strings in one mode and to short out a corresponding quantity in the other string in the other mode, the respective quantities of resistance controlled by said switches being proportional to digit orders of said array of $n-x$ number of digit orders of said code, means for controlling said switches in response to information in said particular array of $n-x$ number of digits of said commands, first and second output circuits, and means responsive to the information in the remaining digits of said commands for establishing connections between said output circuits and said load branches.

18. Apparatus for converting n-digit code commands into analog form comprising first and second impedance networks, the first network including in parallel a first resistor string and a first load branch, the second impedance network including in parallel a second resistor string and a second load branch, means for providing nonlinear response in said load branches in response to a particular array of $n-x$ digits of said commands, said means comprising $n-x$ number of two-mode switches each arranged to short out a quantity of resistance in one of said strings in one mode and to short out a corresponding quantity in the other string in the other mode, the respective quantities of resistance controlled by said switches being proportional to digit orders of said array of $n-x$ number of digit orders of said code, means for controlling said switches in response to information in said particular array of $n-x$ number of digits of said commands, a resolver having first and second input circuits and means responsive to the information in the remaining digits of said commands for establishing connections between said input circuits and said load branches.

19. Apparatus for converting $n$-digit code commands into analog form comprising first and second impedance networks, the first network including in parallel a first resistor string and a first load branch, the second impedance network including in parallel a second resistor string and a second load branch, means for providing nonlinear response in said load branches in response to a particular array of $n-x$ digits of said commands, said means comprising $n-x$ number of two-mode switches each arranged to short out a quantity of resistance in one of said strings in one mode and to short out a corresponding quantity in the other string in the other mode, the respective quantities of resistance controlled by said switches being proportional to digit orders of said array of $n-x$ number of digit orders of said code, means for controlling said switches in response to information in said particular array of $n-x$ number of digits of said commands, a resolver having first and second input circuits respectively supplied by said load branches, and means responsive to the remaining digits of said commands for rotating the resolver null due to any given set of voltage values supplied to said respective input circuits by the load branches.

20. Apparatus for converting $n$-digit code commands into analog form comprising first and second impedance networks, a resistor in series with each of said networks, the first network including in parallel a first resistor string and a first load branch, the second impedance network including in parallel a second resistor string and a second load branch, $n-x$ number of two-mode switches each arranged to short out a quantity of resistance in one of said strings in one mode and to short out a corresponding quantity in the other string in the other mode, the quantities of resistance respectively controlled by said switches being proportional to digit orders of a particular array of $n-x$ number of digit orders of said code, means for controlling said switches in response to information in said particular array of $n-x$ number of digits of said commands, a resolver having first and second input circuits respectively supplied by said load branches, and means responsive to the remaining digits of said commands for rotating the resolver null due to any given set of voltage values supplied to said respective input circuits by the load branches.

References Cited in the file of this patent

UNITED STATES PATENTS

| | | |
|---|---|---|
| 2,853,699 | O'Neil | Sept. 23, 1958 |
| 2,975,411 | Hanson | Mar. 14, 1961 |